US008552714B2

(12) United States Patent
Matsushima et al.

(10) Patent No.: US 8,552,714 B2
(45) Date of Patent: Oct. 8, 2013

(54) ROTATION ANGLE SENSOR WITH INCLINED MAGNETS OF UNIFORM PLATE THICKNESS

(75) Inventors: Tomohiro Matsushima, Shimada (JP); Yasuhiro Sugimori, Shimada (JP)

(73) Assignee: Yazaki Corporation, Tokyo (JP)

(*) Notice: Subject to any disclaimer, the term of this patent is extended or adjusted under 35 U.S.C. 154(b) by 220 days.

(21) Appl. No.: 12/760,931

(22) Filed: Apr. 15, 2010

(65) Prior Publication Data

US 2010/0264912 A1    Oct. 21, 2010

(30) Foreign Application Priority Data

Apr. 16, 2009   (JP) .............................. P.2009-099647

(51) Int. Cl.
  *G01B 7/30*   (2006.01)
  *G01R 33/07*   (2006.01)
(52) U.S. Cl.
  USPC .................................. 324/207.25; 324/207.2
(58) Field of Classification Search
  USPC .............................. 324/207.25, 207.2, 207.21
  See application file for complete search history.

(56) References Cited

U.S. PATENT DOCUMENTS

| | | | |
|---|---|---|---|
| 4,570,118 A | | 2/1986 | Tomczak et al. |
| 5,712,561 A | * | 1/1998 | McCurley et al. .......... 324/207.2 |
| 5,757,179 A | * | 5/1998 | McCurley et al. .......... 324/207.2 |
| 5,982,170 A | * | 11/1999 | McCurley et al. .......... 324/207.2 |
| 6,188,216 B1 | | 2/2001 | Fromer |

FOREIGN PATENT DOCUMENTS

JP    2000-28312    1/2000

OTHER PUBLICATIONS

Office Action dated Nov. 20, 2012 from the Japanese Patent Office in a counterpart Japanese application No. 2009-099647.

\* cited by examiner

*Primary Examiner* — Jermele M Hollington
*Assistant Examiner* — David M. Schindler
(74) *Attorney, Agent, or Firm* — Morgan, Lewis & Bockius LLP

(57) ABSTRACT

A rotation angle sensor includes a rotation shaft, a yoke which is made from a magnetic permeable material and includes a first disk portion, a second disk portion and a connection portion magnetically connecting the first disk portion and the second disk portion, the first disk portion and the second disk portion being provided on the rotation shaft in an axial direction of the rotation shaft separately, a first permanent magnet and a second permanent magnet, each having a disk shape which has a uniform plate thickness in a circumferential direction thereof, and which are provided on a first face of the first disk portion and a second face of the second disk portion respectively, the first face being opposed to the second face, a magnetic field detection section which is provided between the first permanent magnet and the second permanent magnet, and generates an output signal in response to an intensity of a magnetic field formed by the first permanent magnet and the second permanent magnet during a rotation of the rotation shaft. The first permanent magnet and the second permanent magnet are inclined with respect to a direction perpendicular to the axial direction of the rotation shaft so that a distance of a line passing through the magnetic field detection section and connecting the first disk portion and the second disc portion in the axis direction of the rotation shaft is gradually changed in accordance to the rotation of the shaft.

4 Claims, 11 Drawing Sheets

ROTATION ANGLE SENSOR WITH INCLINED MAGNETS OF UNIFORM PLATE THICKNESS

BACKGROUND

The present invention relates to a rotation angle sensor which detects a rotation angle of a rotation shaft in such a manner that a hall element detects a magnetic field having intensity gradually changing in the circumferential direction of a disk of a yoke rotating together with the rotation shaft.

The following Patent Document 1 discloses a rotation angle sensor which detects a rotation angle of a rotation shaft in such a manner that a hall element detects a magnetic field having intensity gradually changing in the circumferential direction of a disk of a yoke rotating together with the rotation shaft.

FIGS. 7 and 8 show a configuration of the rotation angle sensor having the same structure as that of the rotation angle sensor disclosed in the following Patent Document 1 and detecting the rotation of the rotation shaft.

A rotation angle sensor 1 shown in FIGS. 7 and 8 includes a yoke 7 which is made from a highly permeable material and is provided in a rotation shaft 5 rotatably supported to a sensor casing 3, a permanent magnet 9 which is fixed to the yoke 7, and a hall element (hall IC) 11 which generates an output signal in response to a force of an applied magnetic field.

Since the rotation shaft 5 has a shaft engagement hole 5a which is formed through the center of the rotation shaft and engages with a driving shaft (not shown), the rotation shaft 5 rotates together with the driving shaft engaging with the shaft engagement hole 5a.

As shown in FIGS. 7, 10A and 10B, the yoke 7 has a configuration in which a pair of disks 7a and 7b fixed to two positions of the rotation shaft 5 in a flange shape and spaced from each other in the axial direction of the rotation shaft 5 is integrally formed with a connection portion 7c magnetically coupling the pair of disks 7a and 7b through press molding using a highly permeable metal plate.

The pair of disks 7a and 7b is attached to the rotation shaft 5 so as to be perpendicular to the axial direction of the rotation shaft 5. A shaft engagement hole 8 is formed through each of the disks 7a and 7b so as to be concentric with the shaft engagement hole 5a.

As shown in FIG. 9, the permanent magnet 9 includes a pair of magnet plates 9a and 9b respectively laminated on the facing surfaces of the pair of disks 7a and 7b.

The pair of magnet plates 9a and 9b has substantially the same shape as those of the pair of disks 7a and 7b in a plan view. As shown in FIGS. 9, 11A and 11B, a shaft engagement hole 10 is formed through the center of each of the magnet plates so as to be concentric with the shaft engagement hole 5a.

As for the shape from a side view, the pair of magnet plates 9a and 9b has a taper structure in which a plate thickness gradually changes in the circumferential direction as shown in FIG. 11A. This is because a magnetic field is formed so as to have a magnetic force gradually changing in the circumferential direction along the outer peripheries of the pair of disks 7a and 7b.

The rotation shaft 5 is made from a resin. The pair of disks 7a and 7b and the magnet plates 9a and 9b are integrally formed with the rotation shaft 5 through insert molding, and a shaft assembly 15 shown in FIG. 9 can be assembled for the sensor casing 3.

The hall element 11 is fixed to the sensor casing 3 so that a magnetic field detecting portion 11a is located in the middle of a gap between the pair of permanent magnets 9 and 9 facing each other in the outer peripheries of the pair of disks 7a and 7b. The output terminal of the hall element 11 is connected to an external connection terminal 17 installed in the sensor casing 3.

In the rotation angle sensor 1 shown in FIGS. 7 and 8, as described above, the magnet plates 9a and 9b have a structure in which the thickness of each of the magnet plates gradually changes in the circumferential direction of the pair of disks 7a and 7b. Accordingly, when the shaft assembly 15 is rotationally driven in a direction depicted by the arrow E of FIG. 8, a spaced distance (gap) between the magnetic field detecting portion 11a and each of the magnet plates 9a and 9b gradually changes in the circumferential direction of the disks 7a and 7b. Accordingly, since the magnetic flux density crossing the magnetic field detecting portion 11a changes, the output of the hall element 11 changes in response to the rotation angle of the shaft assembly 15, thereby detecting the rotation angle of the rotation shaft 5.

[Patent Document 1] JP-A-2000-028312

However, in the related rotation angle sensor 1 having a structure in which a plate thickness of each of the magnet plates 9a and 9b fixed to the disks 7a and 7b gradually changes as shown in FIG. 11A in order to form a magnetic field having intensity gradually changing in the circumferential direction along the outer peripheries of the pair of disks 7a and 7b, since the weight increases due to the increased plate thickness of each of the magnet plates 9a and 9b, and trouble is taken for the operation of processing the magnet plates 9a and 9b each having a tapered surface, there is a problem in that it is difficult to decrease the cost.

SUMMARY

The present invention is contrived to solve the above-described problem, and an object of the invention is to provide a rotation angle sensor capable of facilitating a process by simplifying a shape of a permanent magnet used to form a magnetic field, and realizing a decrease in cost and weight by decreasing the size thereof.

In order to achieve the above object, according to the present invention, there is provided a rotation angle sensor comprising:

a rotation shaft;

a yoke which is made from a magnetic permeable material and includes a first disk portion, a second disk portion and a connection portion magnetically connecting the first disk portion and the second disk portion, the first disk portion and the second disk portion being provided on the rotation shaft in an axial direction of the rotation shaft separately;

a first permanent magnet and a second permanent magnet, each having a disk shape which has a uniform plate thickness in a circumferential direction thereof, and which are provided on a first face of the first disk portion and a second face of the second disk portion respectively, the first face being opposed to the second face; and a magnetic field detection section which is provided between the first permanent magnet and the second permanent magnet, and generates an output signal in response to an intensity of a magnetic field formed by the first permanent magnet and the second permanent magnet during a rotation of the rotation shaft, wherein the first permanent magnet and the second permanent magnet are inclined with respect to a direction perpendicular to the axial direction of the rotation shaft so that a distance of a line passing through the magnetic field detection section and connecting the first disk portion and the second disc portion in the axis direction of the rotation shaft is gradually changed in accordance to the rotation of the shaft.

Preferably, a first attaching face of the first permanent magnet and a second attaching face of the second permanent magnet, which are attached to the first face of the first disk portion and the second face of the second disk portion respectively, are inclined with respect to the direction perpendicular to the axial direction of the rotation shaft.

Preferably, the first face of the first disk portion and the second face of the second disk portion are inclined with respect to the direction perpendicular to the axial direction of the rotation shaft.

Preferably, the magnetic field detection section is a hall element.

Preferably, the magnetic field detection section is provided between outer peripheral end portions of the first disk portion and the second disk portion.

Preferably, the rotation angle sensor is used as an Automatic Transmission, AT, shift position sensor of a vehicle.

Preferably, the rotation angle sensor is used as a throttle position sensor of a vehicle.

Preferably, the rotation angle sensor is used as a fuel remaining amount sensor of a vehicle.

According to the above configuration, the first and second disk portion of the yoke for fixing the first and second permanent magnets thereto are attached to the rotation shaft in an inclined posture, and a gap between the magnetic field detection section and the first and second disk portions gradually changes during the rotation of the shaft portion. For this reason, even when the first and second permanent magnets fixed to the first and second disk portions are formed as a disk shape having a uniform plate thickness respectively, the gap between the first and second permanent magnets and the magnetic field detection section gradually changes together with the rotation of the first and second disk portions, thereby forming a magnetic field having intensity gradually changing in the circumferential direction along the outer peripheries of the first and second disk portions.

That is, even when the first and second permanent magnets are respectively formed as a disk shape having a uniform plate thickness, if the first and second disk portions are rotationally driven together with the rotation shaft, the gaps between the magnetic field detection section and each of the first and second permanent magnets gradually changes in the circumferential direction of the first and second disk portions. Accordingly, since the magnetic flux density crossing the magnetic field detection section changes, the output of the magnetic field detection section changes in response to the rotation angle of the rotation shaft, thereby detecting the rotation angle of the rotation shaft.

In addition, since each of the first and second permanent magnets fixed to each of the first and second disk portions of the yoke has a simple structure in which the plate thickness is uniform, it is not necessary to perform a process requiring time. Accordingly, it is possible to decrease process cost, and realize a decrease in cost.

Further, since the plate thickness of each of the first and second permanent magnets is uniform and thin (the thickness is thinned), it is possible to decrease the amount of the material. Accordingly, it is possible to realize a decrease in cost or a decrease in weight.

According to the above configurations, since the rotation angle sensor is used as the AT shift position sensor, the throttle position sensor, the fuel remaining amount sensor, and the like of the vehicle, it is possible to contribute to a decrease in size, weight, and cost of the vehicle.

In the rotation angle sensor according to the invention, the first and second permanent magnets fixed to the first and second disk portions of the yoke are formed as a simple disk shape having a uniform plate thickness respectively, and a decrease in size is realized by the simple and thinned structure of the permanent magnets. Accordingly, it is possible to realize a decrease in cost and weight.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, a rotation angle sensor acceding to preferred embodiments of the invention will be described in detail with reference to the drawings.

Figure 1:
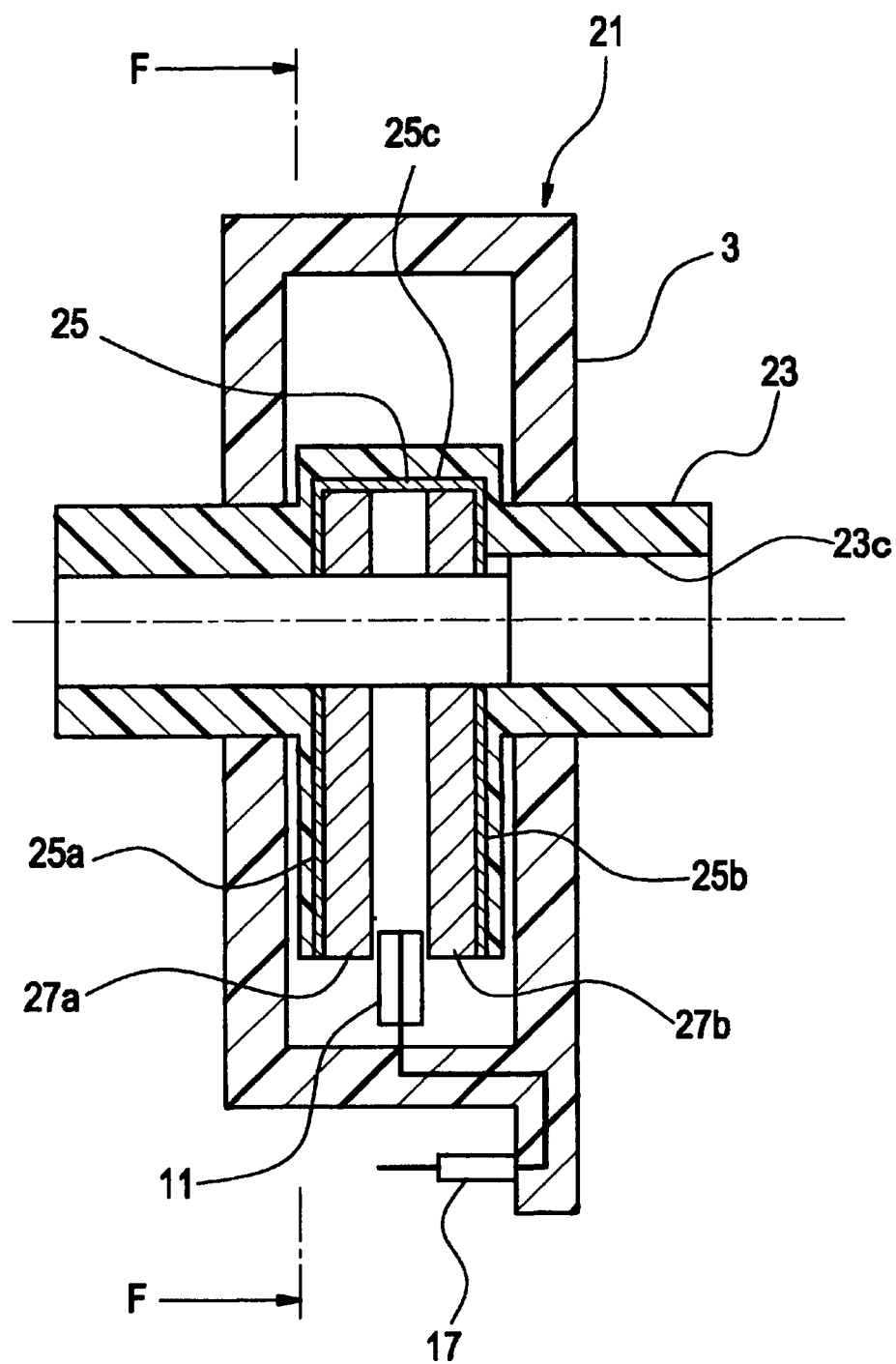
FIG. 1 is a longitudinal sectional view of a rotation angle sensor according to an embodiment of the invention.
Figure 2:
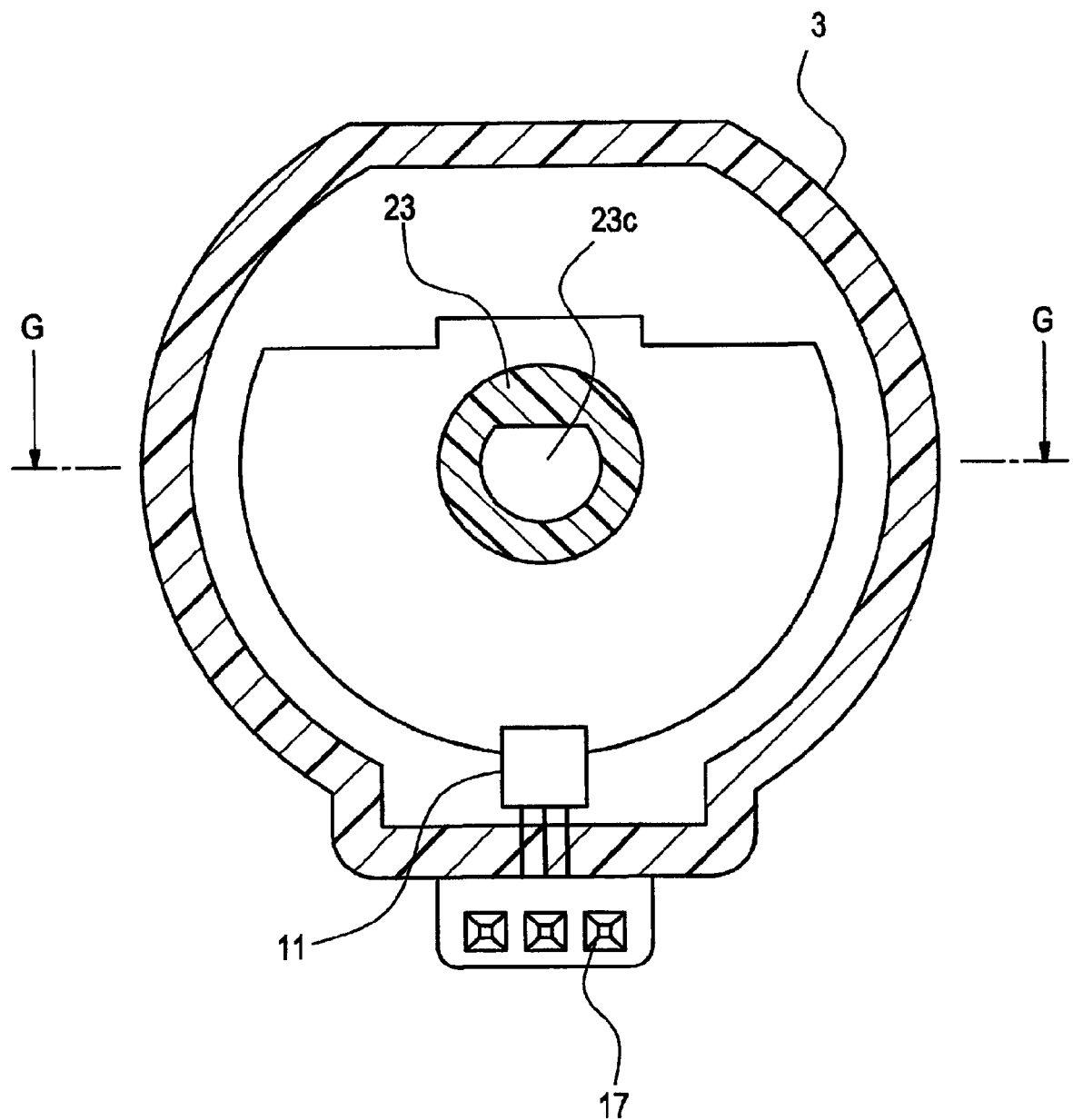
FIG. 2 is a sectional view taken along the line F-F of FIG. 1.

As shown in FIGS. 1 and 2, a rotation angle sensor 21 according to the embodiment of the invention includes a yoke 25 which is made from a highly permeable material and is provided in a rotation shaft 23 rotatably supported to a sensor casing 3, a permanent magnet 27 which is fixed to the yoke 25, and a hall element (hall IC) 11 which generates an output signal in response to intensity of an applied magnetic field.

Since the rotation shaft 23 has a shaft engagement hole 23c which is formed through the center of the rotation shaft and engages with a driving shaft (not shown), the rotation shaft rotates together with the driving shaft engaging with the shaft engagement hole 23c.

Figure 4A:
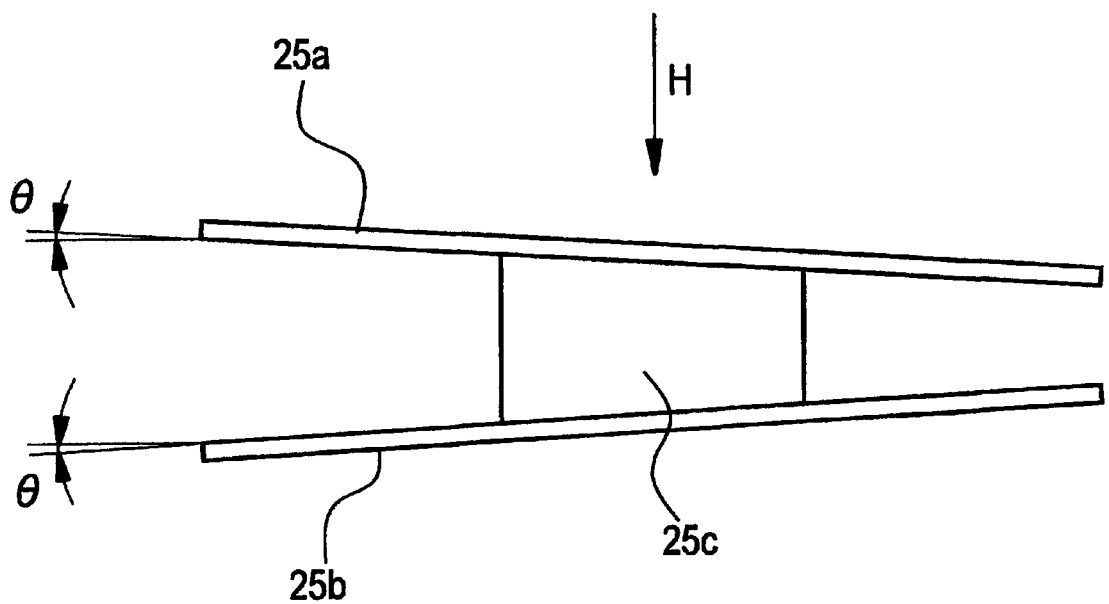
FIG. 4A is a side view of a yoke used in the rotation angle sensor shown in FIG. 1.
Figure 4B:
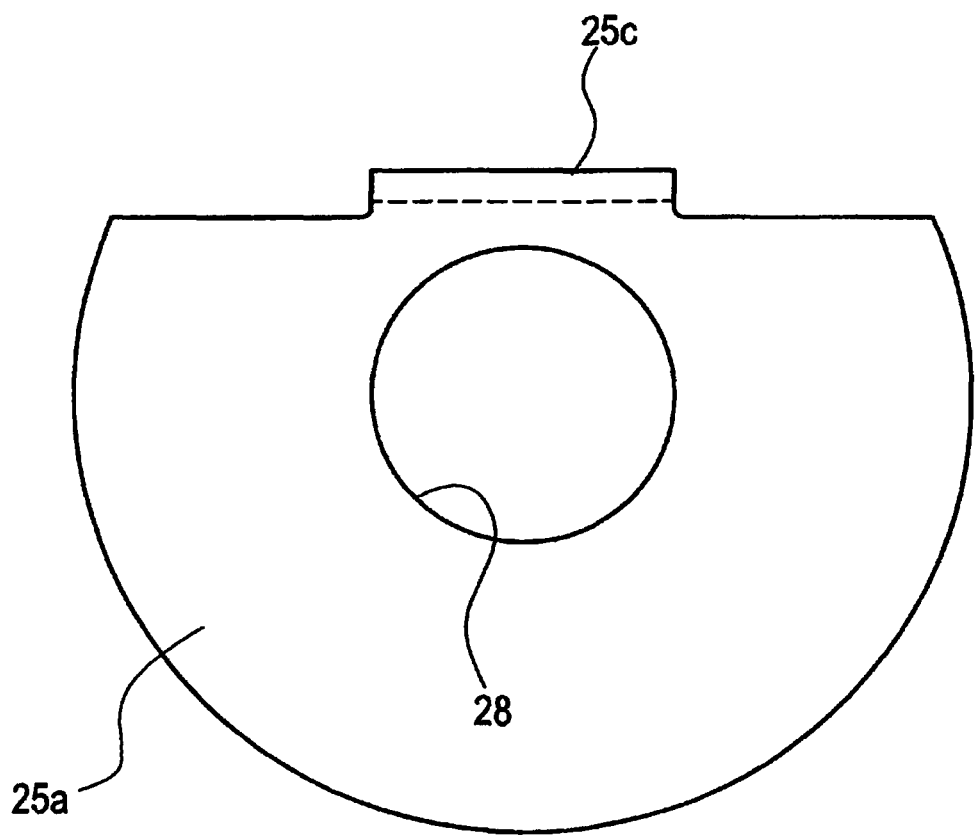
FIG. 4B is a diagram showing a shape when a product H is seen from the outside thereof.

As shown in FIGS. 1, 4A and 4B, the yoke 25 has a configuration in which a pair of disks 25a and 25b fixed to two positions on the rotation shaft 23 in a flange shape and spaced from each other in the axial direction of the rotation shaft 23 is integrally formed with a connection portion 25c magnetically coupling the pair of disks 25a and 25b through press molding using a highly permeable metal plate.

The hall element 11 is fixed to the sensor casing 3 so as to be located at the sensor installation position (the position shown in FIGS. 1 and 2) provided in the outer peripheries of the pair of disks 25a and 25b fixed to the rotation shaft 23.

The sensor installation position is a middle position between the pair of disks 25a and 25b in the axial direction of the rotation shaft 23, and a position interposed between the outer peripheries of the pair of disks 25a and 25b in the radial direction of the rotation shaft 23.

Figure 3:
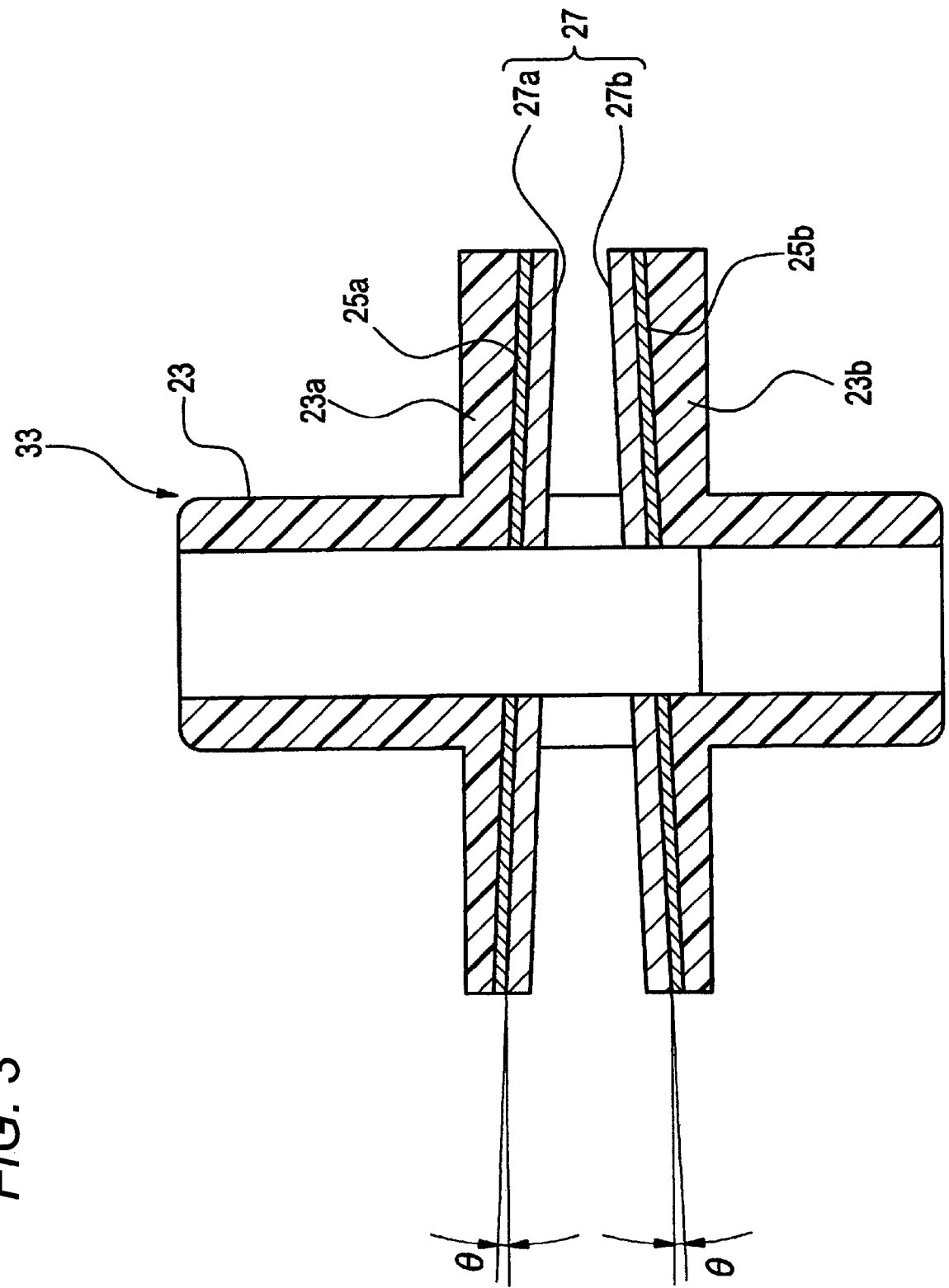
FIG. 3 is a sectional view taken along the line G-G of a shaft assembly of the rotation angle sensor shown in FIG. 2.

In the case of the embodiment, as shown in FIGS. 3, 4A and 4B, the pair of disks 25a and 25b is fixed to the rotation shaft 23 so as to have an inclined posture of an inclined angle θ in which a spaced distance (gap) between the surfaces of the outer peripheral edges of the disks 25a and 25b and the hall element 11 gradually changes in the circumferential direction of the disks 25a and 25b together with the rotation of the pair of disks 25a and 25b.

In addition, a shaft engagement hole 28 is formed through each of the disks 25a and 25b so as to be concentric with the shaft engagement hole 23c.

Figure 5A:
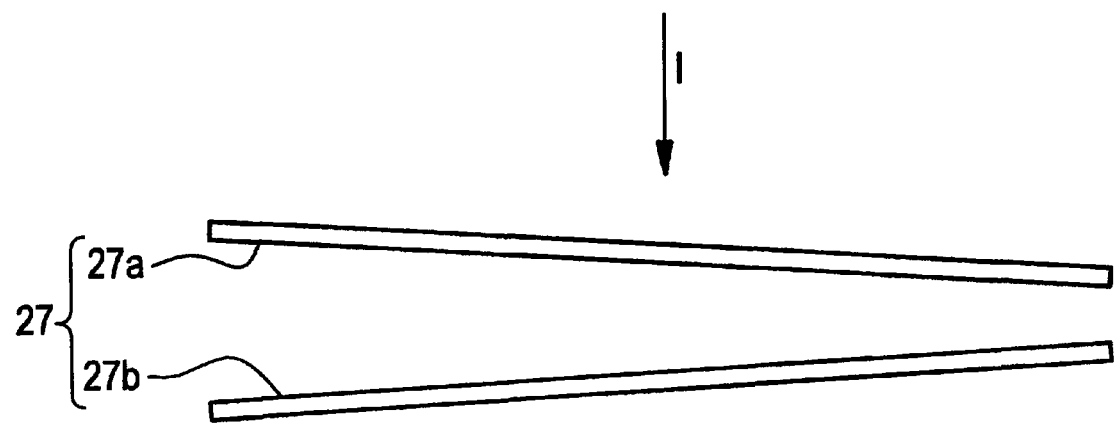
FIG. 5A is a side view of a pair of permanent magnets used in the rotation angle sensor shown in FIG. 1.
Figure 5B:
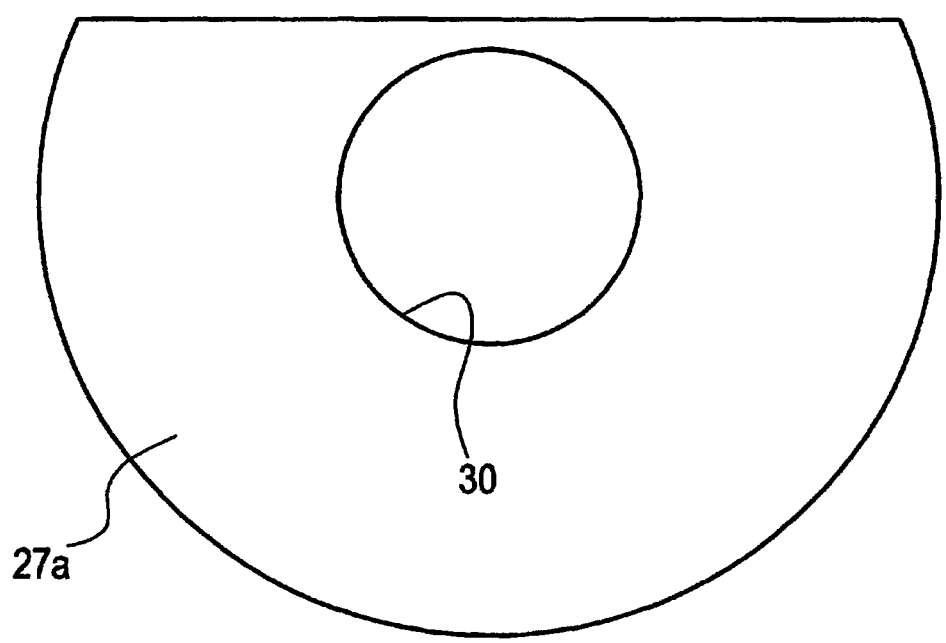
FIG. 5B is a diagram showing a shape when a product I is seen from the outside thereof.

As shown in FIGS. 3, 5A and 5B, the permanent magnet 27 includes a pair of magnet plates 27a and 27b respectively laminated on the facing surfaces of the pair of disks 25a and 25b.

Since the pair of magnet plates 27a and 27b is formed in a disk shape having a uniform plate thickness, the shapes of the magnet plates 27a and 27b are substantially the same as those of the disks 25a and 25b in a plan view. In addition, a shaft engagement hole 30 is formed through the center of each of the magnet plates 27a and 27b so as to be concentric with the shaft engagement hole 23c.

The rotation shaft 23 is made from a resin. The pair of disks 25a and 25b and the magnet plates 27a and 27b are integrally formed with the rotation shaft 23 through insert molding, and a shaft assembly 33 shown in FIG. 3 can be assembled to the sensor casing 3.

In addition, as shown in FIG. 3, a part of a resin forming the rotation shaft 23 is laminated on the outer peripheral surfaces of the pair of disks 25a and 25b to thereby form protection walls 23a and 23b for protecting the disks 25a and 25b.

As described above, the hall element 11 is fixed to the sensor casing 3 so that a magnetic field detecting portion 11a is located in the middle of the gap between the pair of magnet plates 27a and 27b in the outer peripheries of the pair of disks 25a and 25b. The output terminal of the hall element 11 is connected to an external connection terminal 17 installed in the sensor casing 3.

Figure 6:
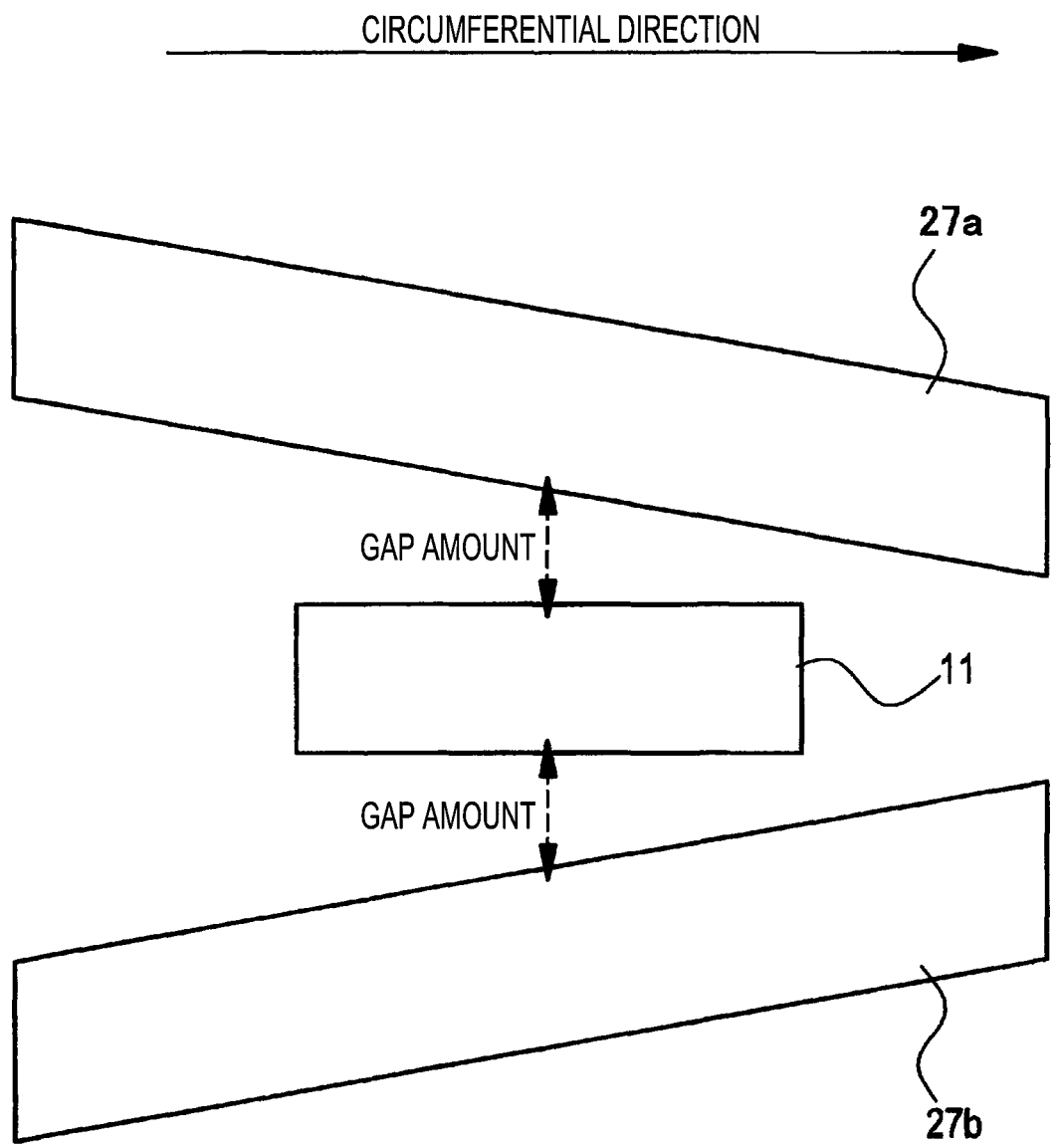
FIG. 6 is an explanatory diagram of a gap between a hall element and a permanent magnet according to the embodiment of the invention.
Figure 7:
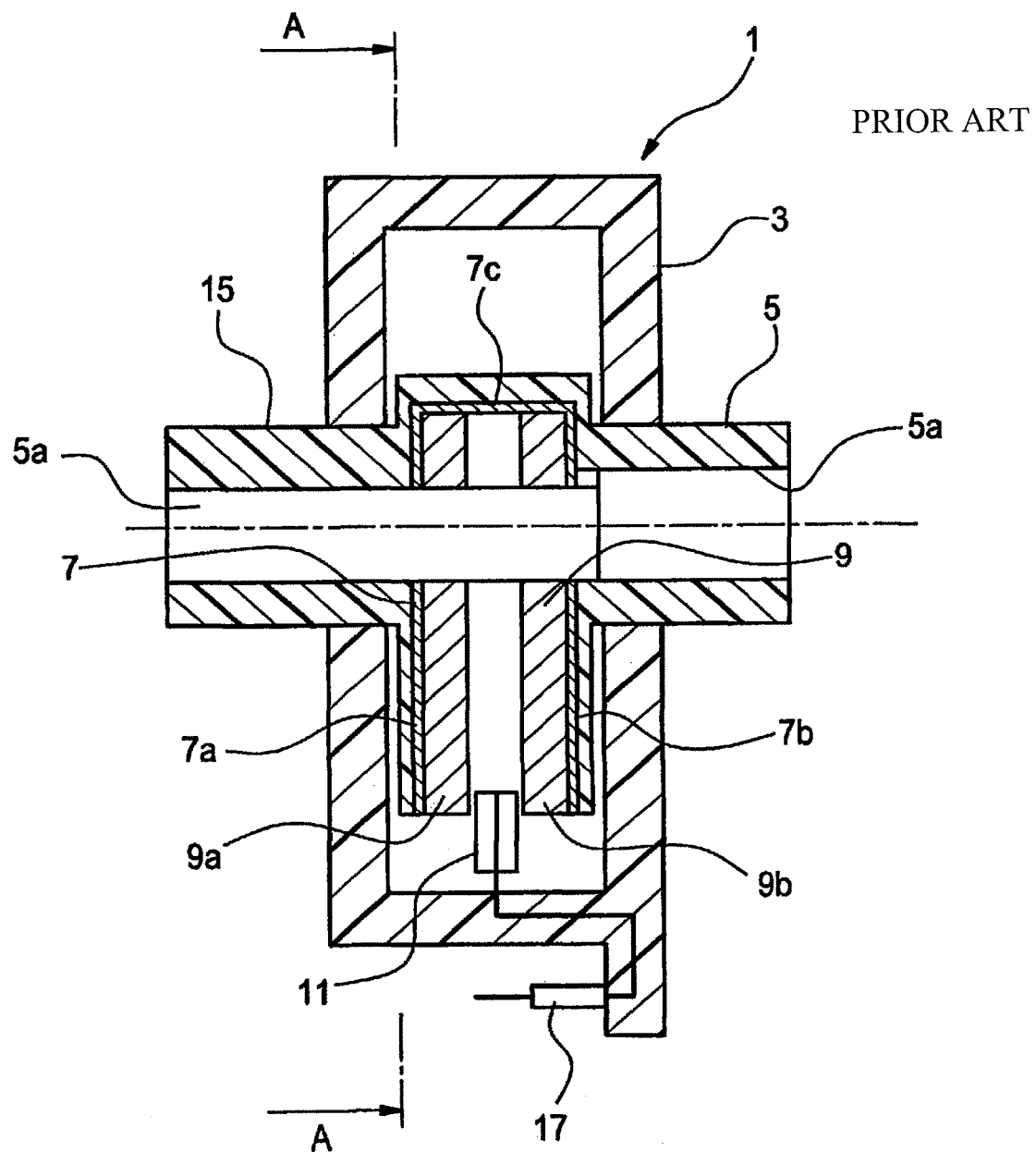
FIG. 7 is a longitudinal sectional view of a related rotation angle sensor.
Figure 8:
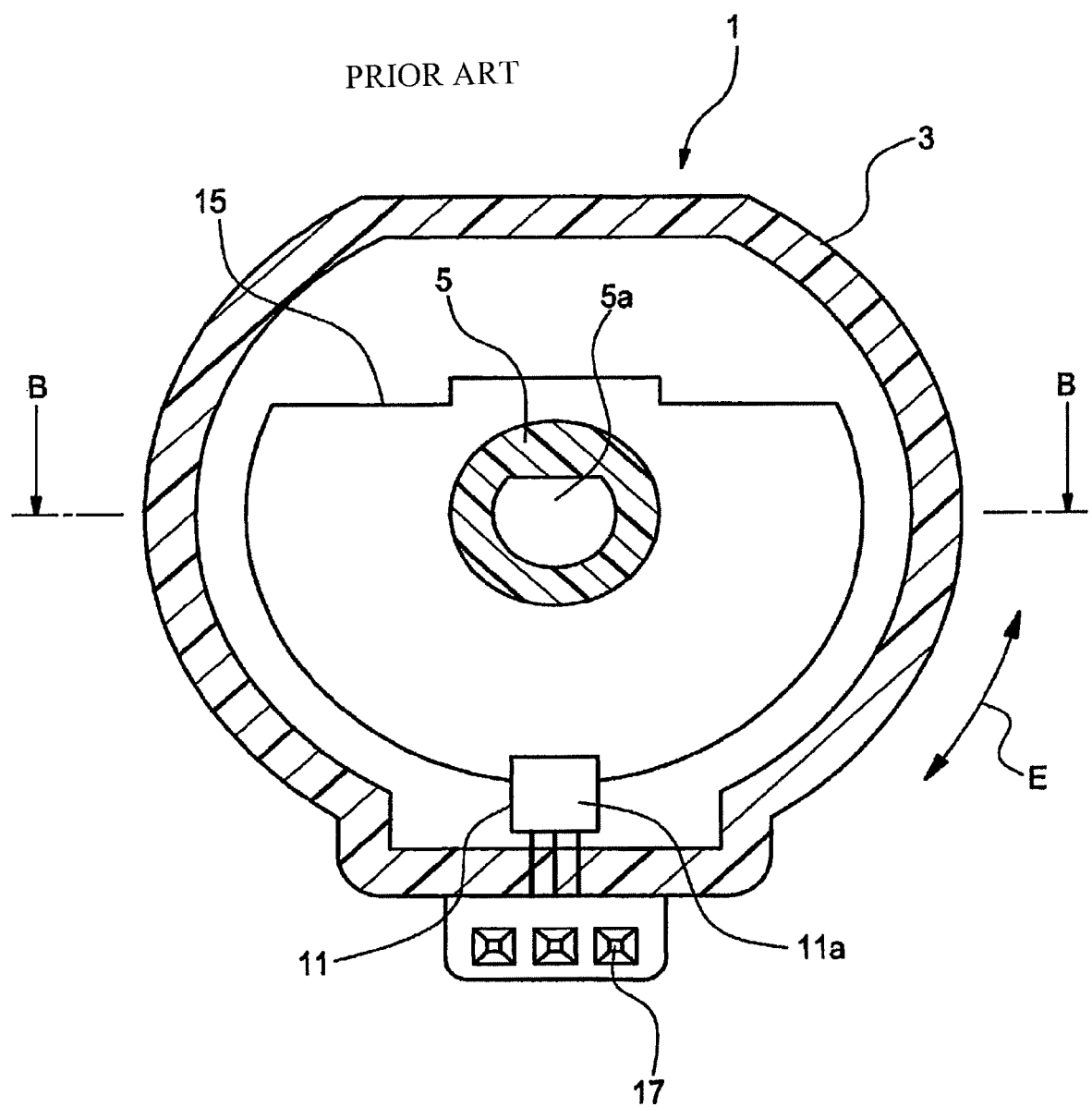
FIG. 8 is a sectional view taken along the line A-A of FIG. 7.
Figure 9:
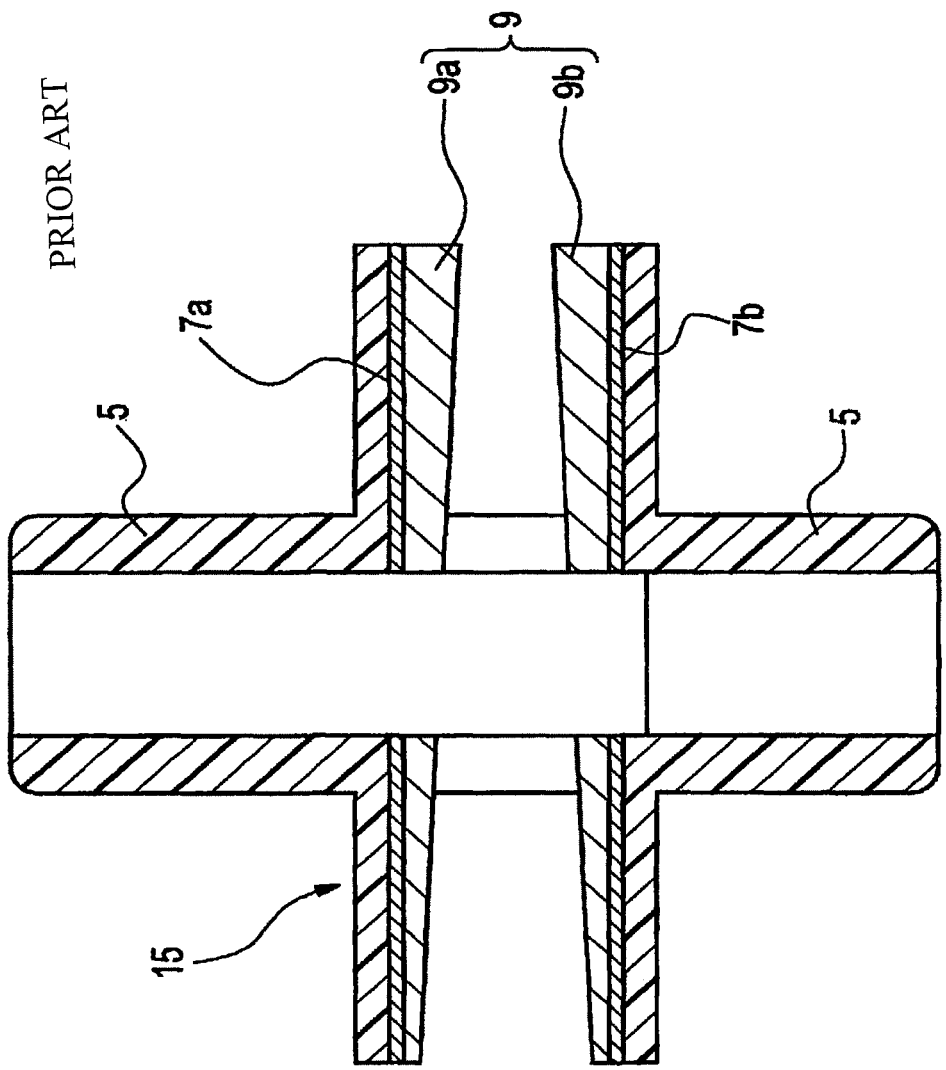
FIG. 9 is a sectional view taken along the line B-B of a shaft assembly of the rotation angle sensor shown in FIG. 8.
Figure 10A:
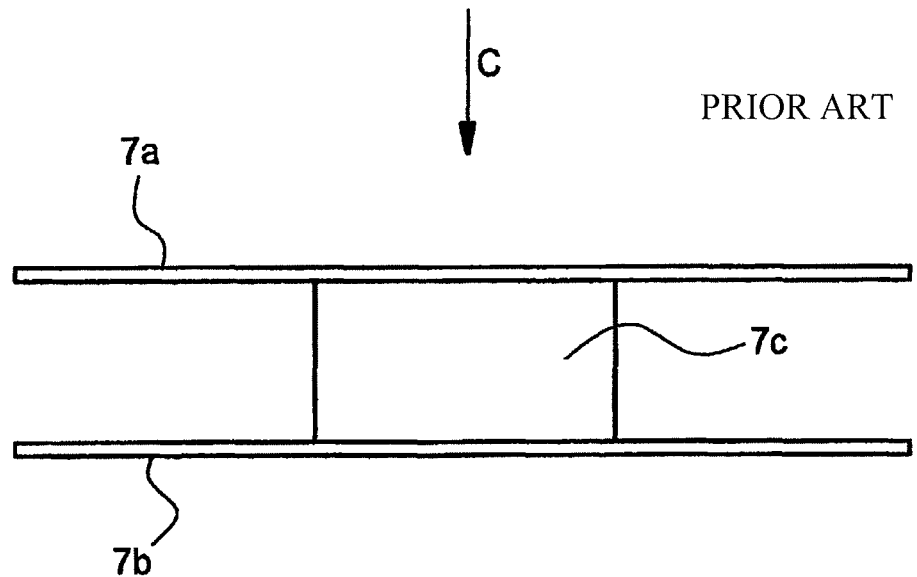
FIG. 10A is a side view of a yoke used in the rotation angle sensor shown in FIG. 7.
Figure 10B:
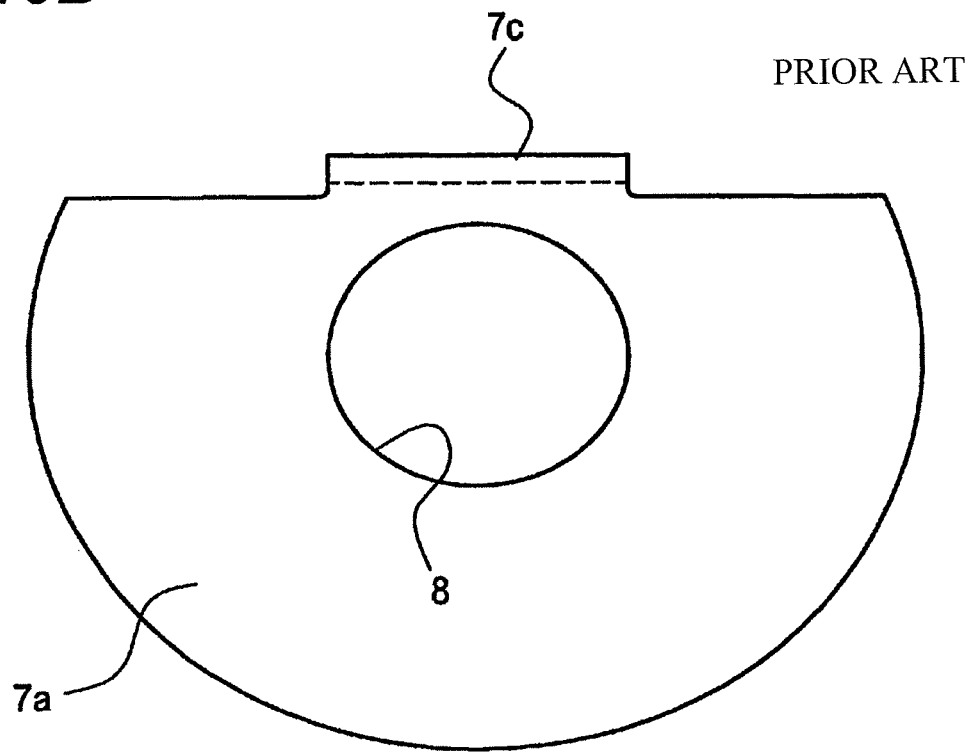
FIG. 10B is a diagram showing a shape when a product C is seen from the outside thereof.
Figure 11A:
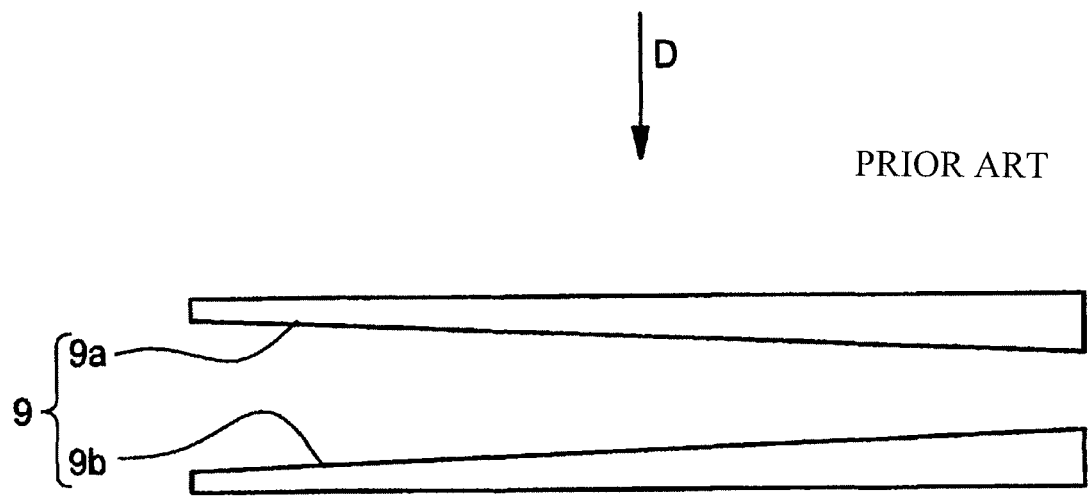
FIG. 11A is a side view of a pair of permanent magnets used in the rotation angle sensor shown in FIG. 7.
Figure 11B:
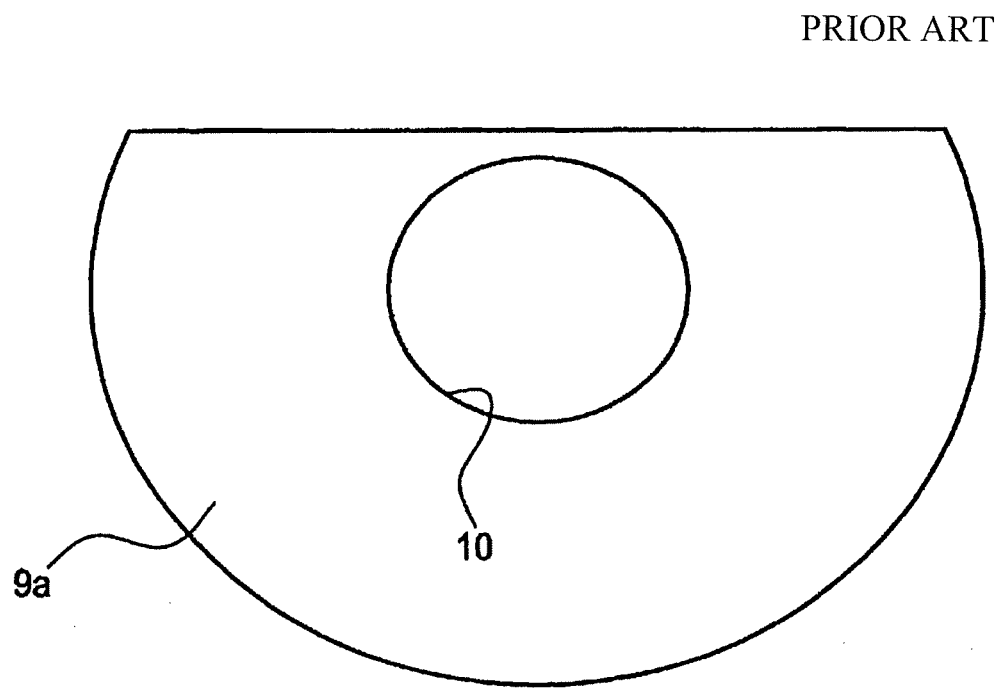
FIG. 11B is a diagram showing a shape when a product D is seen from the outside thereof.

In the above-described rotation angle sensor 21 according to the embodiment, since the pair of disks 25a and 25b of the yoke 25 for fixing the permanent magnet 27 thereto is attached to the rotation shaft 23 in an inclined posture, the gap between the hall element 11 and the disks 25a and 25b gradually changes during the rotation. For this reason, even when the magnet plates 27a and 27b fixed to the disks 25a and 25b are formed as a disk shape having a uniform plate thickness, as shown in FIG. 6, the gap between each of the magnet plates 27a and 27b and the hall element 11 gradually changes together with the rotation of the disks 25a and 25b to thereby form a magnetic field having intensity gradually changing in the circumferential direction along the outer peripheries of the pair of disks 25a and 25b.

That is, even when the magnet plates 27a and 27b are formed as a disk shape having a uniform plate thickness, if the disks 25a and 25b are rotationally driven together with the rotation shaft 23, the gap between each of the magnet plates 27a and 27b and the hall element 11 gradually changes in the circumferential direction of the disks 25a and 25b. Accordingly, since the magnetic flux density crossing the hall element 11 changes, the output of the hall element 11 changes in accordance with the rotation angle of the rotation shaft 23, thereby detecting the rotation angle of the rotation shaft 23.

In addition, since each of the magnet plates 27a and 27b fixed to the pair of disks 25a and 25b of the yoke 25 is formed to have a simple structure in which the plate thickness is uniform, it is not necessary to perform a process requiring time. Accordingly, it is possible to decrease a process cost, and to realize a decrease in cost.

Further, since the plate thickness is uniform and thin, it is possible to decrease the amount of material. Accordingly, it is possible to realize a decrease in cost or a decrease in weight.

Furthermore, since the rotation angle sensor is used as an AT shift position sensor, a throttle position sensor, a fuel remaining amount sensor, and the like of a vehicle, it is possible to contribute to a decrease in size, weight, and cost of the vehicle.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2009-099647 filed on Apr. 16, 2009, the contents of which are incorporated herein for reference.

What is claimed is:

1. A rotation angle sensor comprising:
a rotation shaft;
a yoke which is made from a magnetic permeable material and includes a first disk portion, a second disk portion and a connection portion magnetically connecting the first disk portion and the second disk portion, the first disk portion and the second disk portion being provided on the rotation shaft and opposed to each other in an axial direction of the rotation shaft;
a first permanent magnet and a second permanent magnet, each having a disk-like shape and a uniform thickness throughout, and which are provided on a first face of the first disk portion and a second face of the second disk portion respectively, the first face being opposed to the second face; and
a magnetic field detection section which is provided between the first permanent magnet and the second permanent magnet, and generates an output signal in response to an intensity of a magnetic field formed by the first permanent magnet and the second permanent magnet during a rotation of the rotation shaft,
wherein the first permanent magnet and the second permanent magnet are inclined with respect to a direction perpendicular to the axial direction of the rotation shaft so that a length of a line that is parallel to the axial direction of the rotation shaft connecting the first permanent magnet and the second permanent magnet and traversing the magnetic field detection section changes as the permanent magnets rotate proximate to the magnetic field detection section in accordance with the rotation of the shaft.

2. The rotation angle sensor according to claim 1, wherein the first face of the first disk portion and the second face of the second disk portion are inclined with respect to the direction perpendicular to the axial direction of the rotation shaft.

3. The rotation angle sensor according to claim 1, wherein the magnetic field detection section is a hall element.

4. The rotation angle sensor according to claim 1, wherein the magnetic field detection section is provided between outer peripheral end portions of the first disk portion and the second disk portion.

* * * * *